United States Patent [19]

Dinges

[11] Patent Number: 4,872,985
[45] Date of Patent: Oct. 10, 1989

[54] METHOD FOR APPLICATION OF WASTEWATER TO PLANTS FOR IMPROVED WASTEWATER TREATMENT

[76] Inventor: Ray Dinges, 3404 Buckrace, Austin, Tex. 78748

[21] Appl. No.: 928,996

[22] Filed: Nov. 10, 1986

[51] Int. Cl.$^4$ ............................................. C02F 3/32
[52] U.S. Cl. .................................... 210/602; 210/747
[58] Field of Search ............... 210/602, 621, 622, 747, 210/170

[56] References Cited

U.S. PATENT DOCUMENTS

| | | | |
|---|---|---|---|
| 3,894,355 | 7/1975 | Carothers | 210/602 X |
| 4,169,050 | 9/1979 | Sefling et al. | 210/602 |
| 4,333,263 | 6/1982 | ADey | 210/602 X |

FOREIGN PATENT DOCUMENTS

| | | | |
|---|---|---|---|
| 3244787 | 6/1984 | Fed. Rep. of Germany | 210/602 |
| 3423226 | 12/1985 | Fed. Rep. of Germany | 210/602 |

Primary Examiner—Tom Wyse
Attorney, Agent, or Firm—John N. Shaffer, Jr.

[57] ABSTRACT

A method and means for application of wastewater to plants for improved wastewater treatment having an overhead distribution system for application of wastewater to plants. Purification of agricultural, commercial, domestic, mining and industrial liquid wastes by passage of said wastes through a shallow basin, pond, tank or the like covered with water or other species of Pontederiaceae, e.g. Pontederia spp., in particular, and other species cultured in a hydroponic mode in conjunction with or separately from Pontederiaceae, is accomplished by distribution of recycled liquid waste onto leaves and stems of the plants by spraying, sprinkling, splashing or the like. Depending on the quality and quantity of the wastewater, appropriate application rates, either intermittently or continuously, are utilized to effect positive contact of said liquid waste with living biota attached upon plants roots to attain greater treatment effectiveness and efficiency; to maintain aerobiosis in the root zone; and to, under a continuous application mode, exploit plants leaves as solid substrate for biofilm attachment so as to fashion a living filter that further improves system effectiveness, efficiency and cost worthiness.

4 Claims, 3 Drawing Sheets

METHOD FOR APPLICATION OF WASTEWATER TO PLANTS FOR IMPROVED WASTEWATER TREATMENT

BACKGROUND OF THE INVENTION

This invention relates to an improved wastewater treatment method and means through application of wastewater on to plants. Specifically, the invention relates to the utilization of a controlled culture of water hyacinth and/or other species of the *Pontederiaceae* family, in shallow basins for treating domestic, agricultural, and industrial wastewaters, and the like.

Culture of hyacinth (*Pontederiaceae*) in shallow, earthen basins for treatment of various wastewaters commenced in the mid-1970's. Some early systems are presently in operation. An engineering assessment of this process revealed that adequate data is available for system design, although much remains to be learned about the function and management of the same. See *Aquaculture Systems for Wastewater Treatment-An Engineering Assessment*. U.S. Environmental Protection Agency Report 430/9-80-007, June, 1980, pp. 63-80.

Some states have now formulated criteria for hyacinth basins. A typical criteria might be the requirement of multiple rectangular basins, each of about one acre provided with multiple inlets and outlets. A constant inflow rate is specified. Basins have a hydraulic detention of 3-5 days and are operated at depths of about three feet. Basins must annually be taken out of service, drained, dried, and excess sediment removed.

Hyacinth do not survive in saline water and are killed by freezing temperatures. As a result, hyacinth culture in uncovered basins year-round is only feasible in southern California, Florida and Texas within the continental United States. Greenhouse culture is necessary elsewhere, and such culture will mostly be below latitude 32 degrees North. As is known, other species of *Pontederiaceae*, e.g. *Pontederia cordata*, can be cultured in greenhouses in cold temperature climates.

Properly loaded, hyacinth basins are capable of producing high quality effluents, low in oxygen-demanding matter, suspended particles, and total nitrogen. Phosphorus, at best, is only removed by some 30–40%, but the clear effluent facilitates chemical removal of phosphorus by precipitation. Significant advantages of hyacinth over conventional bacterial-based systems include:

(1) consistency of high quality effluent production;
(2) lower capital and operating costs;
(3) better energy utilization;
(4) they are more environmentally acceptable; and
(5) in particular, their capability of returning nitrogen back into the atmosphere in gaseous form is preferable.

Hyacinth grow rapidly and absorb soluble nutrients, particularly nitrogen. Except for carbon dioxide obtained from air, biomass is derived from wastewater nutrients. One management approach is to continually harvest the hyacinth with the harvest rate matched with optimum plant productivity to maximize nutrient uptake and removal. Such a scheme, because of harvesting and processing costs, must result in salable products. The market potential of waste-grown hyacinth is thought to be greater for dairy and beef cattle rations than for methane generation, compost or other products. As a result, commercial hyacinth production implies a warm climate, extensive culture area, large wastewater flows and a nearby product market, a combination of requirements that exist only in southern Florida within the continental United States.

Systems used solely for treatment practice minimal harvesting of plants along basin edges to preclude sudd formation, with complete removal of hyacinth at the time of basin cleaning only. The main features of a hyacinth basin are: an overstory of plant leaves about three feet high; a shallow aerobic zone with a dense, intertwined mat of roots; a facultative open water zone; and an anaerobic benthal sediment layer. Typically, most particulate sedimentation and carbonaceous oxygen demand reduction takes place in the upstream side portion of a basin.

A hyacinth leaf consists of a tubular petiole and a flattened blade or lamina (stems and leaves). Both stems and leaves have thousands of tiny openings (stoma) per square centimeter to serve for gas exchange (oxygen, carbon dioxide, and water vapor). Oxygen, either that absorbed from the atmosphere or resulting from photosynthesis, is transported, probably mostly by diffusion, through leaves, stems and submersed rhizomes into roots, and thence into surrounding waters. This mechanism in conjunction with the ability of roots to extract nutrients from the water, even when present in minute amounts, permits hyacinth to grow in anaerobic semisolid organic sludges or in clean spring waters. Plant diffusion of oxygen into the shallow waters in the root zone is a key factor in the function of an aerobic hyacinth basin. Leaves shade the surface, retarding algae growth, and contribute to basin water stillness that enhances sedimentation. Typically, the stems and leaves of hyacinth, except for nutrient uptake, have no direct role in cleansing wastewaters.

It is known that the depth of root mat (root length) is related to nutrient levels, especially nitrogen, in wastewaters. Typically, roots extend about six inches below the surface. Root length may be up to eighteen inches in the lower ends of basins when effective nitrogen exhaustion has been attained. The oxygen resource of the root zone is mainly dependent upon that diffusing from roots and a small amount that diffuses into the water surface from the atmosphere. Up to about 100 pounds of $BOD_5$ per acre each day can be imposed on a basin without exhausting available oxygen. This limited loading is a major constraint of the current systems due to space needs.

Because of the dominating presence of a large floating plant and diverse, extensive macrofauna populations, the complex ecosystems of aerobic hyacinth basins have to be viewed in an entirely different context than artificially limited environments of conventional treatment units strongly dominated by aerobic microbiota.

Populations of a hyacinth basin grow or decline in number according to food (organic loading or $BOD_5$) available. Hydraulic flow control is the only practical method of assuring relative steady input of food. This requires an equalization basin. An alternative is to size basins on maximum expected organic and hydraulic loadings, as both can be excessive. Excessive hydraulic loading can cause system "breakthrough". Organic overload is damaging, both on a short-term and long-term basis. Replacement time for some macrofauna species is brief, but others, such as predaceous insect larvae, will be absent until laying time the following spring. Death of the numerous fish species, crayfish, etc., present requires restocking. The tenuous nature of available oxygen resources requires very careful control of food (organic) input.

Recognizing that nitrification and much removal of carbonaceous oxygen demand and suspended particles occur in the root mat, researchers have directed attention to techniques for bringing more wastewaters in contact with microbiota on hyacinth roots to improve the system. Techniques tested include; emplacement of overflow baffles perpendicular to flow; extensive recirculation; and compressed air injection.

Emplacement of closely spaced overflow baffles in full-sized hyacinth basins is impractical and a study involving recirculation of wastewaters fifteen times through a 7-foot deep basin resulted in only slightly improved effluent quality over that obtained from a once-through flow in the control unit.

Compressed air injection, aside from cost and inefficiency of oxygen transfer at shallow depth, has several detrimental effects. Some of these are:

(1) aerobiosis allows bacterial dissimilation of benthal debris;

(2) feed-back from aerobic microbial decomposition of benthal debris stimulates more unneeded bacterial biomass, requiring even more oxygen;

(3) habitat and carbon source required by nitrifiers are eliminated, thereby reducing system capability for total nitrogen extirpation;

(4) turbulence interferes with sedimentation;

(5) the valuable sediment storage function is removed;

(6) settled particles are resuspended;

(7) stored metals are freed from benthal sediment; and (8) although sediment accumulation is severely reduced by continuous recycle back to the water column, clearance of basins at regular intervals is necessary to prevent sudd formation. This would entail removal of air distribution tubing from basins, obviously impractical and very expensive on a large scale.

One technique evaluated on a pilot-scale involved directed air injection via floating headers to effect horizontal flow within the root mat zone. This approach leaves the anaerobic benthal debris layer relatively undisturbed and near surface water turbulence probably has minimal adverse impact on sedimentation. Horizontal flow induced through the thick, entangled root mass was likely limited, but in spite of this, pronounced treatment efficiency and effectiveness was recorded, including enhanced total nitrogen removal. Surface flow induction using air release may be viable in very small basins but placement of headers and air lines at adequate intervals to assure surface water turbulence throughout a full-sized basin would be impractical. Removal of headers and air lines from a basin covered with a dense stand of mature hyacinth at cleaning time would be a most difficult and costly operation. See *Community Waste Research at the Walt Disney World Resort Complex*. Brochure-Walt Disney World Resort, Orlando, Fla., 1986.

Frost protection of citrus trees by water spray has been practiced for many years. Likewise, frost protection of hyacinth growing in open basins at Shreveport, La. has been evaluated. Screened effluent was sprayed onto plants at times when air temperatures were near or below freezing. Spraying, however, did not prevent hyacinth death.

U.S. Pat. No. 4,169,050, granted to Serfling and Mendola, and titled "Buoyant Contact Surface in Waste Treatment", involved employment of bottom-anchored, buoyant plastic ribbons for microorganism attachment in a greenhouse-covered 8-foot deep lagoon aerated by bottom-released compressed air. The lagoon was to be stocked with various faunal species and the surface used for culture of floating plants including duckweeds, hyacinth, and water fern, with plants being harvested and put to useful purposes.

Another feature of the system involved spraying water into the air for solar heating and cooling and humidity control, a technique commonly called "misting" that is widely practiced by greenhouse operators growing nursery plants or food crops. Incidental benefits of mist spraying mentioned were aeration, water movement, pest removal, and foliar-feeding of the plants.

A relatively small quantity of water was used in misting, but very clean water was required to preclude clogging of the tiny openings of the mist nozzles.

Drawbacks to current wastewater treatment utilizing floating plants then are the ineffective methods for enhancing root/biofilm contact as previously discussed, such as baffling recirculations and upwelling using compressed air. Thus, there is a need in the art for providing a wastewater treatment that enhances root/biofilm contact without unnecessarily disrupting the normal functions of the hyacinth wastewater treatment device. It, therefore, is an object of this invention to provide an improved water treatment that enhances root/biofilm contact; that enhances aerobic conditions for the increased effectiveness of the system as a whole; that reduces the cost of construction of facilities through enhanced effectiveness of the system as a result of increased system capacity; that utilizes and exploits the overstory of the floating plants thereby improving system efficiency and effectiveness and expanding treatment capacity; that does not disturb sediments and that does not require the complete removal and replacement of application/distribution devices once installed.

SHORT STATEMENT OF THE INVENTION

Accordingly, the wastewater treatment of the present invention includes a wastewater treatment basin for temporarily holding wastewater introduced at one end and released at another end. Within the treatment basin are located floating aquatic plants, water hyacinth (*Eichhornia crassipes*) or other species of *Pontederiaceae*, e.g. *Pontederia spp.*, etc. A water pump is located near the exit end of the basin and draws water directly from the basin. The water is directed through a series of connecting pipes to a distribution system suspended above the basin or mounted on basin berms. Distribution of wastewater onto leaves (petioles and lamina) and the root mat of water plants is accomplished by spraying, sprinkling, splashing, and the like. As a result, utilizing a recirculation rate of at least 1:1 and an application rate of 1 to 5 mgad or more, ensures positive contact of most basin influent with root mass and biofilm attached thereto.

Rather even, gentle aerial distribution of wastewater onto plant stands results in gradual displacement of waters in the root zone with replacement time being controlled by application rate. Water drops splatter into smaller droplets as they strike stems and leaves. Some splash onto the water surface directly, while others slowly trickle down over the leaves and stems into the basin. The expanded water surface film facilitates oxygen diffusion into basin waters and the root zone remains highly aerobic.

Distribution devices (spray nozzles, sprinklers, splash plates, etc.) and associated piping related to implementation of the present invention can be suspended from greenhouse structures, or mounted on berms in locations that will not interfere with routine maintenance of basins or with periodic basin cleaning operations.

Additionally, the present invention may be utilized in other embodiments to perform as a clarifier or a sludge thickener. As a result, whether used as the initial basin for wastewater treatment, a clarifier, or a sludge thickener, the utilization of the present invention through exploitation of the overstory by distribution of wastewater onto *Pontederiaceae* species improves system efficiency and effectiveness and expands treatment capacity. Further, energy, operational, and maintenance costs will be modest considering the greater treatment effectiveness attained.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
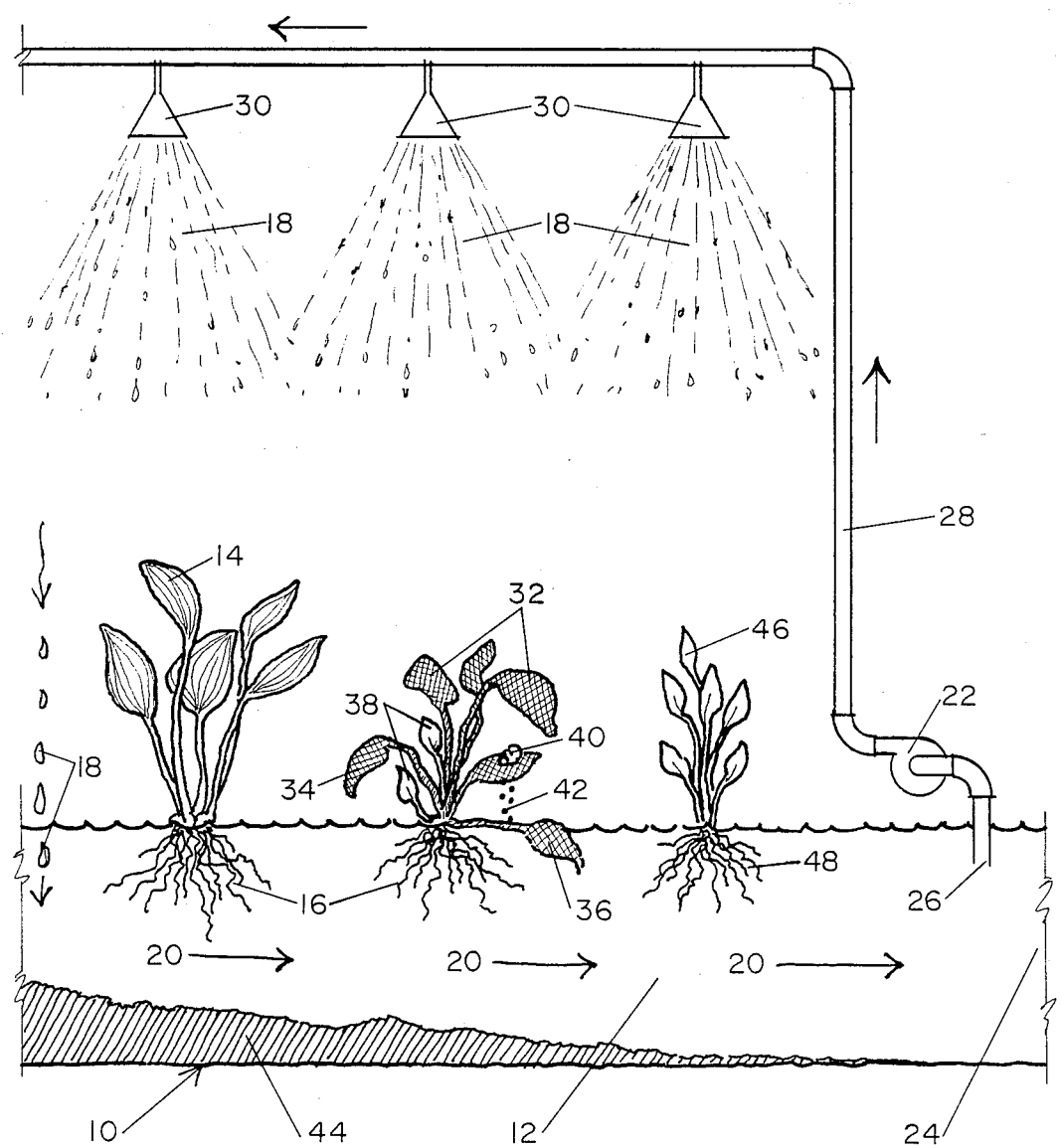
FIG. 1 is a vertical cross-sectional view of the structure and application of a preferred embodiment of the present invention.
Figure 2:
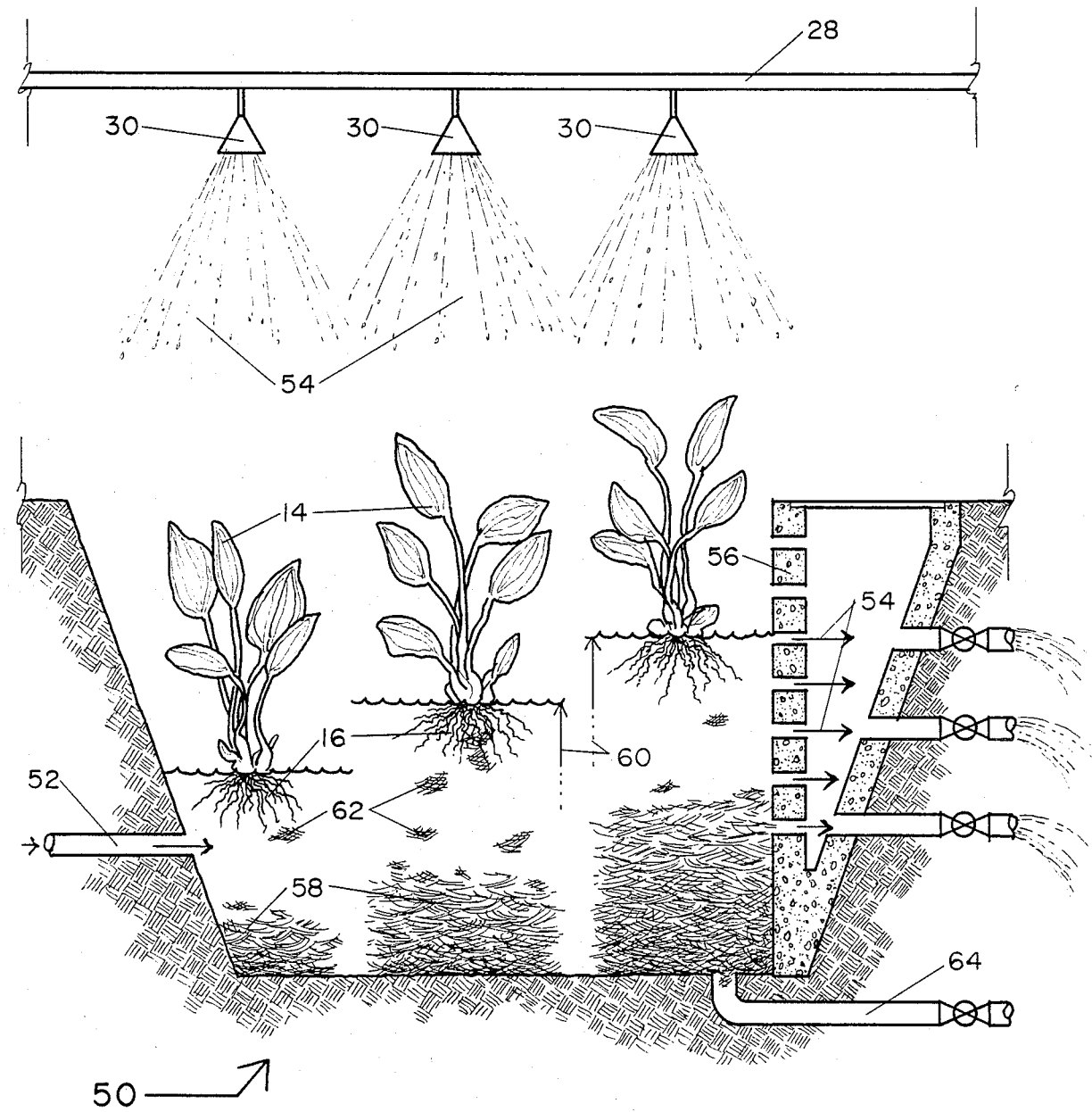
FIG. 2 is a vertical cross-sectional view of a portion of a floating plant clarifier.
Figure 3:
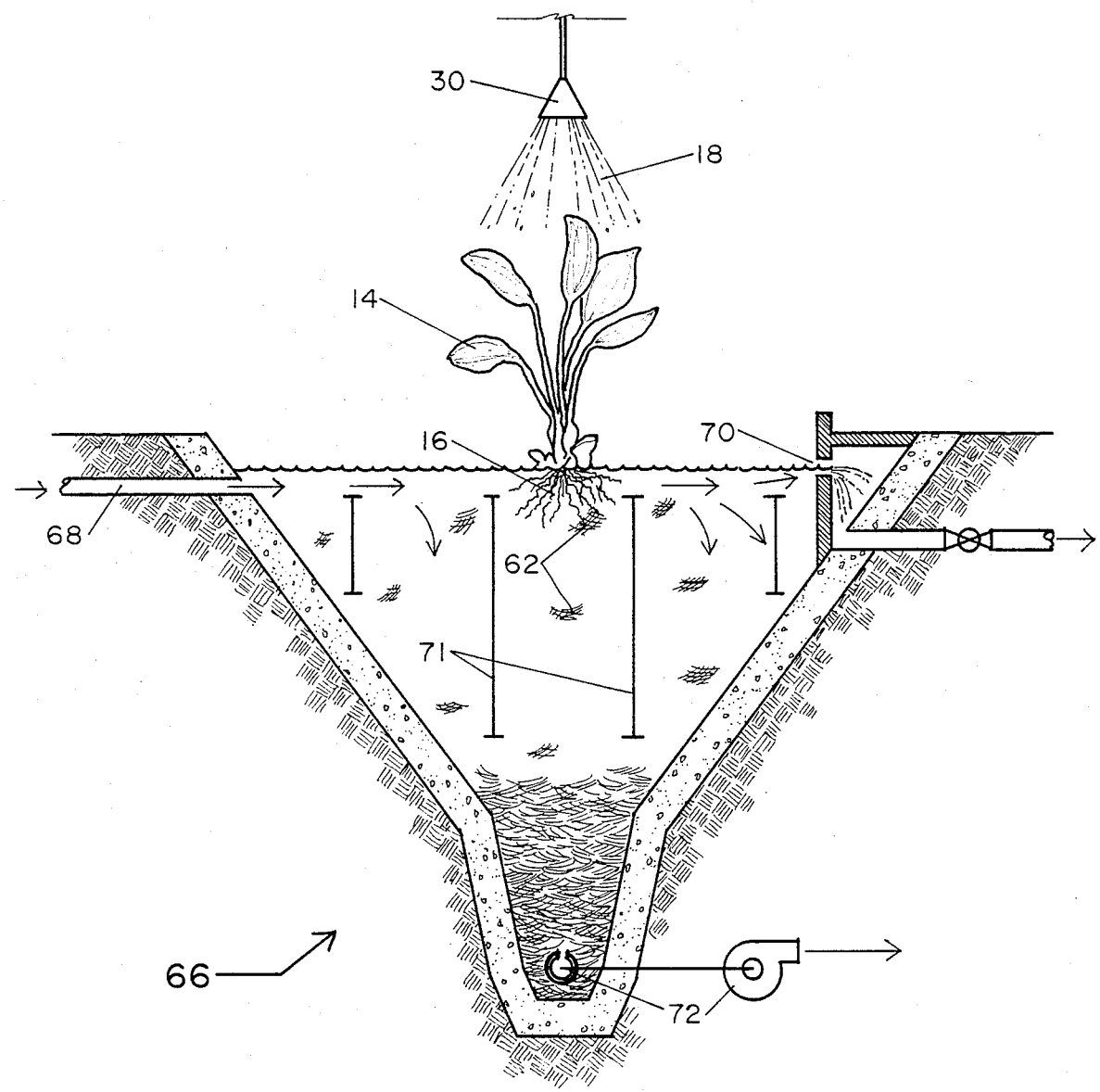
FIG. 3 is a vertical cross-sectional view of a portion of a floating plant sludge thickener.

The preferred embodiment of the present invention is illustrated by way of example in FIGS. 1–3. With specific reference to FIG. 1, treatment device 10 is illustrated by means of shallow basin 12 within which is grown floating plants 14. Water hyacinth (*Pontederiaceae*) 14 have extensive fibrous roots 16 through which wastewater 18 flows. An unrestricted flow path 20 for wastewater 18 is available just below roots 16 for wastewater 18 that enters in this FIG. 1, from the left and proceeds, in this drawing, to the right to an exit not shown. Water pump 22 located in a downstream location 24 draws wastewater 18 into suction inlet 26 and discharges it into connecting pipes 28. Connecting pipes 28 may be suspended from a greenhouse structure (not shown), should it be provided, or mounted on an earthen berm (also not shown). Connecting pipes 28 are designed to receive distribution means such as nozzles or sprinklers 30 that are of a "non-clog" design readily known in the art and not described further herein.

Continuous application of wastewater 18 onto solid substrate results in biofilm formation 32 in about 10 days, whether the substrate is rock, plastic, or plant leaves 14. Following biofilm 32 formation, leaf blades die first, but their structure remains relatively intact 34 for sometime thereafter. The persisting leaf blades and stems slowly degrade. This biological degradation, occurring in the air, does not deplete oxygen resources of the basin 12. Anaerobic micro-habitats in these decaying structures sustain denitrifying bacteria. Refractory plant structure eventually collapse 36 into basin 12. New leaves 38, until covered with biofilm 32, facilitate photosynthesis and gaseous exchange. The highly aerobic conditions prevailing enhances nitrification of applied wastewaters. Additionally, sewage snails 40 (*Physa sp.*) are important biofilm grazers, with their dense fecal pellets 42 rapidly sedimenting and collecting on the bottom of shallow basin 12 and thereby adding to the anaerobic benthal debris layer 44.

Diminution of overstory height of water hyacinth 14 occurs as the biofilm 32 weighs down leaves of hyacinth 14, opening the stand to higher light levels. Death, decay, and collapse of leaves serve to recycle organics and nutrients, further opening the stand of water plants 14. Cessation of continual application and reversion to an intermittent schedule, allows the plants to grow tall 46 while absorbing more nutrients from the wastewaters thus increasing cycling of materials. Additionally, continual displacement of root zone water 48 at a given rate will assure adequate, but not excessive contact of most wastewater 18 applied.

Referring now to FIG. 2, a floating plant clarifier 50, another embodiment of treatment device 10, is illustrated. Floating plant clarifiers 50 may be circular, square, rectangular, and the like and not affect the function of device 10. Entry of liquid wastewater 18 into floating plant clarifier 50 is through multiple submerged entry ports 52 thereby producing "plug flow" through device 10. Clarified effluent 54 would exit shallow basin 12 near the surface over an extended weir, through a perforated baffle 56, through a permeable rock barrier (not shown), or the like.

The depth of the floating plant clarifier 50 could be some 4–6 feet, but liquid depth above sediment/digested sludge 58 would be maintained near or less than 18 inches, with basin water levels adjusted upwards 60 as sediment/digested sludge 58 (refractory matter) accumulates.

Clarifier effluent 54, or nitrified plant effluent, would be distributed through a water distribution system similar to that disclosed in FIG. 1 consisting of a water pump 22, connecting pipes 28 and nozzles or sprinklers 30. Clarifier effluent 54 would be distributed at an appropriate rate over plants 14 at brief intervals throughout the day to preclude the surface water layer from becoming septic, and to dislodge solids 62 from roots 16. Drain pipe 64 connects to the base of clarifier 50 and is utilized for dewatering clarifier 50 for drying and to facilitate sludge removal.

Referring now to FIG. 3, a floating plants sludge thickener 66, may be square, rectangular, circular, or the like. Sludge 58 input to thickener 66 could be near the bottom, either directly or via a well extending to the surface (not shown), in order to enhance particulate agglomeration and flocculation on rising, or, as illustrated in FIG. 3, at points near the surface 68. Flow would be over a peripheral weir (not shown), or through perforations in a baffle 70, as illustrated, located at or near the surface of thickener 66. A series of interior baffles 71 of thickener 66 direct flow near the surface and facilitate maximum contact of particulates with roots 16 to enhance coagulation and settling of particulates.

Sludge 58 would continually be removed by removal pump 72 from floating plants thickener 66 at appropriate set intervals to preclude septicty. Intermittent spraying of wastewater 18 by means previously described, at a high application rate, would be practiced at brief intervals throughout the day to maintain aerobic conditions in the unit and to disperse solids 62 lodged in the roots 16.

In operation then, treatment device 10 functions to distribute wastewaters 18 onto the leaves and root mat of water floating plants 14 by spraying, sprinkling, splashing, and the like, resulting in improved removal of pollutants from wastewaters in shallow, *Pontederiaceae* 14 covered basins 12. Treatment device 10 may be utilized for treating agricultural, domestic, and industrial liquid waste of a varied quality. Application rates, organic and hydraulic loadings on basins, etc. are related to site-specific conditions such as quality of wastewaters being treated; treatment objectives; and operational costs consistent with desired goals. A most probable choice of wastewater distribution onto plant overstory would be spraying using non-clog nozzles 30.

The extensive fibrous roots 16 of *Pontederiaceae* 14 are analagous to the rock or plastic substrate used in the trickling filter process for attachment of biofilm (microbial population). Unlike a conventional trickling filter, solid substrate is submersed in water rather than exposed to air and root substrate exudes oxygen needed by biofilm organisms.

Contact time between water containing pollutants and biofilm is a critical factor of treatment efficiency and, in general, doubling flow in a trickling filter reduces contact time, and thereby efficiency, by about 37%. A discreet particle of water is in contact with a certain area of biofilm very briefly in a trickling filter, as waters pass entirely through the unit in a few minutes. Wastewater-biofilm contact serves to solubilize organics and nutrients that are then assimilated by microbes. Coagulation of colloidal particles is also a beneficial function of biofilm biota.

Horizontal movement of water through the plant root mass in a conventional basin would be ever so slight, particularly as a broad, unrestricted flow path 20 is available just below the root mat 16. Contact time between biofilm and wastewater can also be excessive to need, thereby decreasing system efficiency. A certain area of biofilm being in contact with a discreet particle of water devoid of nutrients due to prior assimilation neither contributes to treatment nor nourishes microbes of the biofilm, a situation no doubt prevalent in conventional hyacinth basins. Continual displacement of root zone water 48 at a given rate will assure adequate, but not excessive, contact of most water applied and the anaerobic benthal debris layer 44, performing the valuable function of organics/nutrients storage and denitrification, would remain intact.

The preferred embodiment of the present invention in aerobic floating plant basins 12 would be intermittent or alternately intermittent-continuous distribution of wastewater 18 onto plant 14 overstory on selected areas in a basin 12 or using the entire basin 12. The preferred application would range from 1 million gallons per acre per day (1 mgad) up to 5 million gallons per acre per day (5 mgad), with similar application rates being used either in the intermittent or continuous application mode. This suggests the use of multiple electrically-driven pumps 22 actuated by timers (not shown).

Hydraulic and organic loadings on the basin 12 would need to be ascertained relative to type of wastewater input and effluent quality desired but in no instance should organic load exceed available oxygen resources, or should hydraulic flow rate be so high as to result in solids wash-out. Preferably, recirculated waters at a rate of 1:1 or more, from a point downstream 24 in basin 12, would have a $BOD_5$ content of less than 15 mg/1 to facilitate extirpation of total nitrogen.

Continuous application of wastewaters onto solid substrate results, as has previously been stated, in the formation of biofilm 32 in about ten days. Concerning the present invention 10, the continuous application mode would be limited to not more than a period of 20–30 days, or ten days for biofilm development and 10–20 days of effective living filter treatment. At that time, the stand of plant 14 being sprayed would be switched to an intermittent application mode. An alternative area, where continuous application had been initiated ten days previously, would then become the living filter, and so on. The application period of the intermittent mode preferred would not be more than a six-hour period each day, centered upon sunrise for maximum effect.

Three critical time elements to be considered are: the time required for biofilm formation; persistence of stems and leaves while covered with biofilm; and the leaf replacement interval.

Following biofilm formation 32, leaf blades die first, but their structure remains relatively intact for some time thereafter. The persisting leaf blades and stems slowly degrade. This biological degradation, occurring in the air, does not deplete oxygen resources of the basin. Anaerobic micro-habitats in these decaying structures sustain denitrifying bacteria. Refractory plant structures eventually collapse into basin 12 waters. New leaves 32, until covered with biofilm 32, facilitate photosynthesis and gaseous exchange. The highly aerobic conditions prevailing enhances nitrification of applied wastewaters.

Intermittent application only might be selected in those cases where rather good quality, secondary effluent is being upgraded to remove nutrients and suspended solids. Intermittent application schedules related to floating plants clarifiers 50 would be dictated by the quality of liquid wastes 18 being clarified or by the denitrification degree desired when recirculated water is nitrified effluent. Preferably, application would be practiced briefly at intervals throughout the day. Intermittent application on floating plant sludge thickeners 66 would be similar so as to preclude septicity. Floating plant clarifiers 50 and floating plant sludge thickeners 66 would be enclosed in greenhouse structures (not shown) screened to preclude entry of flying insects. The present invention has several advantages over existing treatment technology in that a recirculation rate of 1:1, or more, and an application rate of from 1–5 mgad ensures positive contact of most basin influent, wastewater 18, with the root mass of floating plants 14 and the biofilm 32 attached thereto. Limited contact of wastewater with roots-biofilm occurs in conventional units. The present invention, however, is much more effective than other tested techniques, such as upwelling or circulation using compressed air, by enhancing root-biofilm contact. Additionally, rather even, gentle aerial distribution of wastewaters onto floating plant 14 stands results in gradual displacement of waters in the root zone 48, with replacement time being controlled by application rate. Water drops splatter into smaller droplets as they strike stems and leaves. Some splash on to the water surface directly, while others trickle slowly down over the leaves and stems into the basin 12. The expanded water surface film facilitates oxygen diffusion into basin waters 12 and the root zone water 48 remains highly aerobic. Aerobic conditions enhance nitrification of ammonia and increase the rate of carbonaceous oxygen demand removal. Controllable aerobiosis allows greater organic loading and input variation than in a conventional Floating plant basin. As a result, the system capacity increase afforded by the present invention will reduce construction costs, particularly of greenhoused facilities.

Much of the treatment attained in an ordinary floating plant basin occurs in a restricted area near the inlet. The present invention permits selected portions of a basin 12, or the entire basin area, to be utilized for intensive treatment, thereby increasing system capacity and lowering the effective cost of facility construction. The present invention creates a "living trickling filter", with stem-leaf substrate, that makes beneficial use of the plant overstory that typically has little direct involvement in water quality improvement in conventional basins, except for nutrient uptake. The present invention, living filter, is especially beneficial for providing nitrification when applied wastewaters have a $BOD_5$ of less than 15 mg/1. In short, exploitation of the plant overstory improves system efficiency and effectiveness and expands treatment capacity.

The most adverse impact of other tested techniques for bringing wastewaters into contact with roots-biofilm is the resultant disturbance and destruction of the valuable anaerobic benthal debris layer 44 that serves to facilitate denitrification and which stores organics, nutrients, and metals. Employment of the present invention leaves the beneficial benthal deposits undisturbed and intact.

The present treatment device 10 is not only more effective and efficient than existing technology related to aerobic floating plant basins, but is less costly than other methods tested and used. The capital cost of the distribution system of the present invention is small compared to savings realized from greenhouse construction. Energy, operational, and maintenance costs will be modest in comparison considering the greater treatment effectiveness attained. As discussed above, distribution devices; spray nozzles, sprinklers, splash plates, and the like, and associated piping related to the implementation of the present invention can be suspended from a greenhouse structure if it is already in place, or mounted on berms, in locations that will not interfere with routine maintenance of basins 12 or with periodic basin cleaning operations. The previous alternate available technology that is or has been used requires complete removal and replacement of distribution devices, airlines, headers, etc. each time basins are drained and cleaned.

With regard to conventional concrete or steel clarifiers (usually 8-10 feet deep), there is an associated high construction, operating and maintenance cost and they require subsequent sludge handling, treatment and disposal. Inclusive to and integral of the present invention 10 is a floating plant clarifier 50 whose operating depth is variable and maintained at a level consistent to effective clarification of wastewaters and digestion of entrapped sediments, or sludge, and whose surface waters are kept fresh (non-septic) by periodic distribution of water onto the plant overstory. As disclosed, surface hydraulic loadings and effluent weir hydraulic loadings of floating plant clarifiers 50 will be comparable to those of conventional clarifiers. It is anticipated that multiple floating plant clarification units will be enclosed by a screened greenhouse structure. Although periodic removal of refractory sediments will be necessary, this task is facilitated by the ability to easily drain the basin and allow in-situ drying of accumulated sludge. Floating plant clarifiers 50 need not be associated with subsequent hyacinth treatment, but may be employed at all conventional wastewater treatment facilities. In conjunction with suspended solids removal, application of nitrified effluent to a floating plant clarifier will provide denitrification, and thus, extirpation of nitrogen from waters being treated. Not only would floating plant clarifiers of the present invention be much less costly to construct and operate than conventional clarification units, but it would be more effective in suspended solids removal. It is obvious that in-basin digestion of sludge obviates the need for transfer pumps, digestors, and sludge drying beds. Also, obviously, provision of multiple units would allow operational versatility that current clarifiers simply cannot match.

Conventional thickening of sludges prior to digestion is accomplished by centrifuging, air flotation or in settling tanks. Inclusive to and integral of the present invention 10 is floating plant sludge thickener 66. Intermittent, intense application of thickener or plant effluent onto the plant overstory at intervals freshens surface fluids and enhances solids settling. A pump removes accumulated sludge at appropriate set intervals. Diverse configurations of the thickener 66 are feasible and anticipated. Surface and effluent weir hydraulic loading rates would be comparable to those of conventional gravity-type sludge thickeners. Activated sludge, due to its light, fluffy nature, tends to remain suspended or floats to the surface. Conventional deep-stirred, upflow gravity thickening reactors only achieve a solid concentration of about 2-3% at best. This poor performance means that costly anaerobic digestors have to be excessively large. Also, the resulting anaerobic supernatant requires handling and treatment.

In this regard, a foremost advantage and attribute of *Pontederiaceae* culture is suspended solids removal. Floating plant thickeners, then, are especially well suited for concentration of activated sludge when utilized in the manner disclosed by this invention. Solids entering the root mass would coagulate due to physical as well as biological mechanisms. Periodic brief, but intense application of water onto the unit would dislodge chunks of sludge. In settling, dense sludge floc would aggregate with fine suspended particles, carrying them to the bottom. Because of the presence of the dense root mass, surface solids loss would be minimal. Sludge thickener effluent would normally be returned to the head of the treatment plant. Provision of multiple units would allow operational versatility superior to any existing devices.

While the present invention has been disclosed in connection with the preferred embodiment thereof, it should be understood that there may be other embodiments which fall within the spirit and scope of the invention as defined by the following claims.

What is claimed is:

1. A method of wastewater treatment comprising the steps of:
    (a) constructing a wastewater treatment basin for temporarily holding wastewater introduced at one end and released at another end of said basin;
    (b) growing floating aquatic plants in said basin;
    (c) locating a pump means near the end of said basin where said wastewater is released; and
    (d) providing an attaching means, interconnecting said pump, with a plurality of clog-free distribution means, and introducing said wastewater at variable rates and for variable time periods to said plants from above thereby engaging said wastewater with microbial biofilm covering leaves and stems, as well as the root mass, of said plants in purification of said wastewater.

2. The method of water treatment of claim 1, wherein said floating aquatic plants comprise growing aquatic plants of the *Pontederiaceae* family.

3. The method of water treatment of Claim 2 wherein said distribution of said wastewater further comprises:
 (a) continuous distribution of said wastewater onto said plant leaves in a minimum amount equivalent to that of daily inflow to said biofilm on said plant leaves, stems and roots and said microorganisms in said plant root systems during passage through said basin; and
 (b) restricting continuous distribution of said wastewater to selected areas of said plant stand thereby allowing other areas to recover and grow.

4. The method of water treatment of Claim 3 wherein said continuous wastewater distribution onto a specific group of said plants is suspended after a period of some twenty (20) days, after which said continuous distribution is restricted to an intermittent mode allowing said plant leaves to grow to their maximum height, so that once said maximum height is regained continuous wastewater distribution may be resumed.

* * * * *